(12) United States Patent
Bradshaw et al.

(10) Patent No.: US 6,358,356 B1
(45) Date of Patent: *Mar. 19, 2002

(54) HEATED WHEEL FOR APPLICATION OF HEAT-ACTIVATED OR PRESSURE SENSITIVE PRECOATED ADHESIVE TAPE OR STRING

(75) Inventors: Dennis A. Bradshaw, Clackamas, OR (US); Donald W. Scott, Vancouver, WA (US)

(73) Assignee: Linear Products Inc., Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,040

(22) Filed: Mar. 14, 2000

Related U.S. Application Data

(63) Continuation-in-part of application No. 09/452,896, filed on Dec. 1, 1999.
(60) Provisional application No. 60/162,982, filed on Nov. 1, 1999.

(51) Int. Cl.[7] .............................................. B29C 65/18
(52) U.S. Cl. ....................... 156/320; 156/322; 156/359; 156/582; 156/583.1
(58) Field of Search .......................... 156/64, 324, 359, 156/498, 554, 555, 580, 582, 583.1, 320, 322

(56) References Cited

U.S. PATENT DOCUMENTS

| | | | |
|---|---|---|---|
| 2,749,966 A | 6/1956 | Roetger ..................... 154/1.6 |
| 3,412,229 A | 11/1968 | Seagrave et al. ........ 219/10.61 |
| 3,798,110 A | * 3/1974 | Von Gunten ................ 156/582 |
| 3,988,192 A | 10/1976 | Hilgner et al. .............. 156/267 |
| 3,993,526 A | 11/1976 | Off et al. ..................... 156/202 |
| 4,048,765 A | 9/1977 | Samuelson ............... 364/474.3 |
| 4,055,220 A | 10/1977 | Stelwagen et al. ............ 165/89 |
| 4,095,637 A | 6/1978 | Krishnan ..................... 493/187 |
| 4,149,925 A | 4/1979 | Mintz ......................... 156/361 |
| 4,285,758 A | 8/1981 | Clausen et al. ............. 156/264 |
| 4,328,062 A | 5/1982 | Early et al. ................. 156/353 |
| 4,610,904 A | 9/1986 | Mahn, Sr. et al. ............. 428/79 |
| 4,966,639 A | 10/1990 | Pfeffer et al. ............... 156/359 |
| 5,021,111 A | 6/1991 | Swenson .................... 156/498 |
| 5,045,144 A | 9/1991 | Bonemi ....................... 51/328 |
| 5,235,518 A | 8/1993 | Maekawa et al. ........... 156/361 |
| 5,411,625 A | * 5/1995 | Focke et al. ................ 156/359 |
| 5,411,627 A | 5/1995 | Lerner et al. ............... 156/466 |
| 5,582,570 A | 12/1996 | Crowley ..................... 156/323 |
| 5,643,396 A | 7/1997 | Rajala et al. ............... 156/361 |
| 5,662,767 A | 9/1997 | Getz et al. .................. 156/498 |
| 5,665,197 A | 9/1997 | Fujii et al. .................. 156/558 |
| 5,773,796 A | 6/1998 | Crimmins et al. .......... 219/470 |
| 5,843,274 A | * 12/1998 | Chou .......................... 156/582 |
| 5,885,410 A | * 3/1999 | Berkan ....................... 156/582 |

FOREIGN PATENT DOCUMENTS

WO 98 01876 2/1992

OTHER PUBLICATIONS

H.B. Fuller Company Linear Products Division 16 Inch Hot Wheel, Standard Model LM–0800, Operating Manual—Product Literature.

* cited by examiner

*Primary Examiner*—James Sells
(74) *Attorney, Agent, or Firm*—Bin Su (57) ABSTRACT

A heated wheel for applying heat activated tape to a substrate. The wheel includes a rim with a longitudinal axis and a cylindrical outer surface for engaging heat activated tape. An electrical heater is supported within, and in fixed relation to, the rim. The wheel also includes a solid body of polymer and a bearing.

26 Claims, 10 Drawing Sheets

FIG. 8

HEATED WHEEL FOR APPLICATION OF HEAT-ACTIVATED OR PRESSURE SENSITIVE PRECOATED ADHESIVE TAPE OR STRING

CROSS-REFERENCE TO RELATED APPLICATIONS

This application is a Continuation-In-Part of U.S. patent application Ser. No. 09/452,896 filed Dec. 1, 1999 which claims benefit of Provisional Application Serial No. 60/162,982 filed Nov. 1, 1999.

STATEMENT REGARDING FEDERALLY SPONSORED RESEARCH OR DEVELOPMENT

NOT APPLICABLE

BACKGROUND OF THE INVENTION

1. Field of the Invention

The invention relates to a method and apparatus for applying precoated heat activated or pressure sensitive adhesive tape to a substrate, and more particularly to a method and apparatus for activating a thermally activated or pressure sensitive adhesive tape by contacting the tape with the surface of a rim of a heated wheel.

2. Background Information

The manufacturing procedures of various industries include adding a reinforcing tape to sheets of material. In the plywood industry, as described in U.S. Pat. No. 6,098,367, reinforcing tape is applied to sheets of veneer in a plywood composer machine in which sheets of veneer are placed edge to edge and tape is glued perpendicularly across the edges where the sheets touch. The veneer is generally a thin sheet of wood.

In order to form a satisfactory bond the adhesive is raised to the correct application temperature prior to being placed in contact with the wood. Prior art equipment for applying thermally activated tape generally includes a heating element for softening and activating the adhesive and a cool shoe or wheel for pressing the heated tape onto the wood. In such equipment the heating portion generally includes a tube or slot through which the tape is drawn as it is heated. Typical application equipment is shown, for example, in U.S. Pat. No. 4,285,758 to Clausen et al., and U.S. Pat. Nos. 4,692,202 and 5,662,767 to Getz.

During application, as the adhesive-coated tape material is exposed to the heating element, the adhesive is heated to its softening point. Some of the adhesive may flow and separate from the tape before the tape is applied to the veneer. Thus, when using a conventional applicator, over a period of time the heating chamber accumulates the separated hot melt adhesive which tends to run through the heating tube and ultimately drip onto the veneer substrate. This dripped adhesive forms globs which are trapped between the sheets of veneer when the veneer is laminated to form plywood.

During the subsequent process of forming plywood, the glob of adhesive tends to be absorbed into the outer layers of veneer and through to the surface of the plywood. This forms unsightly blotches on the external surface. This problem is of particular concern in the preparation of hardwood plywood, which is used for cabinetry, and in other aesthetically sensitive applications. In such applications, the stain caused by a glob of glue seeping through the outer layer of veneer may substantially destroy the value of the sheet of plywood. The surface veneer of hardwood plywood tends to be particularly thin, and this thinness exacerbates the problem by increasing the probability that the excess glue will seep all the way through the veneer.

Also, the frictional and heat transfer characteristics of the heating tube found in conventional equipment limit the speed at which the tape may be applied. This, in turn, limits the production throughput of the composing equipment. Moreover, these frictional forces result in tension within the bonded tape resulting in internal stresses in the bond and consequent reductions in bond longevity and quality. In contrast, the present invention allows a low tension application of the tape which results in improved bond life and quality.

In addition, when the applicator is used to apply the tape material to the underside of a substrate, separated adhesive also drips onto the applicator frame or onto the floor as the heated tape material leaves the heating element. In this case, frequent cleaning of the dripped adhesive from the frame and floor is required to prevent debris from accumulating at the applicator, and production must often be curtailed for this routine maintenance.

Thus, a need exists for a method and an applicator for efficiently applying a tape with a thermally activated adhesive to the surface of wood veneer while overcoming the problems of prior applicators.

BRIEF SUMMARY OF THE INVENTION

The present inventors have invented a method and an apparatus for efficiently applying a tape with a thermally activatable adhesive, or pressure sensitive adhesive, impregnated therein to the surface of a substrate, such as a wood veneer or decorative wood surfacing material, without the problems of the previous applicator.

According to one aspect of the present invention, a heated wheel with a low-adherence rim is provided. A heater such as an electric resistance heater in contact with the inside of the rim maintains the rim at an appropriate temperature. A tape which may include a reinforcing yarn, or filaments, and which is coated with a hot-melt adhesive, is supplied to the wheel adjacent the rim. The tape passes along a path that includes contact with the wheel over from about 2 to about 270 angular degrees or as much as about 315 angular degrees of the surface of the wheel rim. The wheel rim presses the tape to the wood as the wheel rolls across a broad surface of the substrate. The result is that, during the interval while the tape is in contact with the rim, the hot-melt adhesive with which it is impregnated is activated (melted), and when the tape is pressed to the surface of the wood, it adheres to the substrate. The tape is thus heated and transferred from the surface of the wheel to the surface of the wood, where it forms an adhesive reinforcing member unitizing one piece of substrate to another.

In the present invention, the interior portion of the wheel includes a polymer casting adjacent the heater. This casting provides structure to the wheel, and thermally insulates the heater from a bearing turning on a shaft at the center of the wheel.

An automatic controller, taking signals from a sensor near the rim of the wheel, can be used to maintain the rim at the correct temperature. The sensor may be embedded in the polymer casting. The signals from this sensor, as well as the power conducted by wires to the heater, pass through a slip-ring assembly mounted in a mounting arm that supports the wheel.

Thus, unwanted globs of glue within the plywood are avoided and the applicator apparatus and the floor around it remain free of waste adhesive.

The term tape is used herewithin as a generic term referring to a flexible elongate reinforcing member comprising a tape, string, or cord. The cross section of the tape may be substantially rectangular, circular, or oval. The tape may comprise structural components such as strips, strands or filaments of various materials, including polymers such as polyester. The tape is generally impregnated with a heat activated hot melt adhesive. The hot melt adhesive is heated prior to being placed in contact with the wood and then cooled to cure the adhesive and form a strong bond between the tape and the wood.

DETAILED DESCRIPTION OF THE INVENTION

Figure 1:
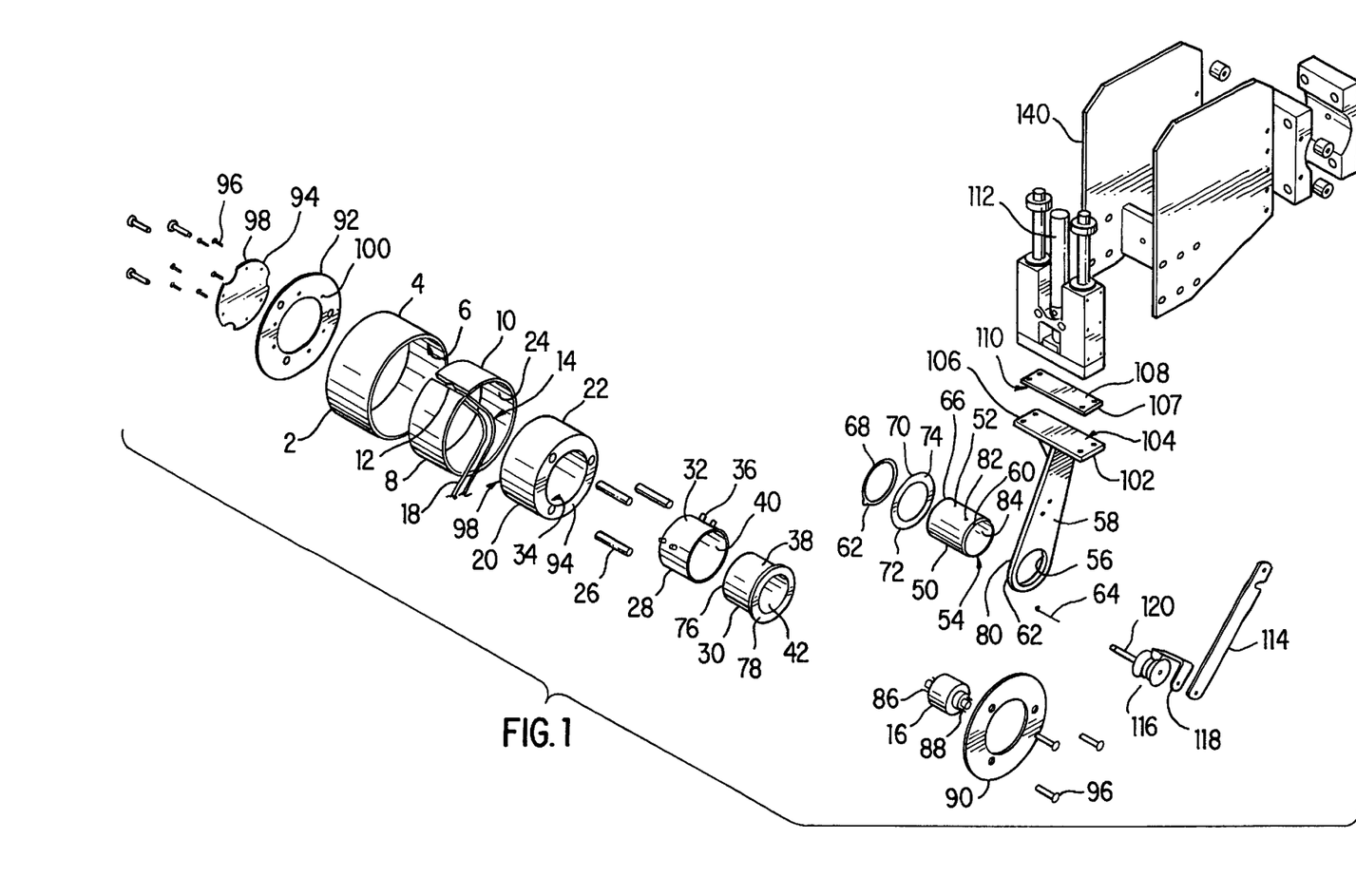
FIG. 1 represents an exploded perspective view of the heated wheel assembly including the pneumatic mounting apparatus.
Figure 2:
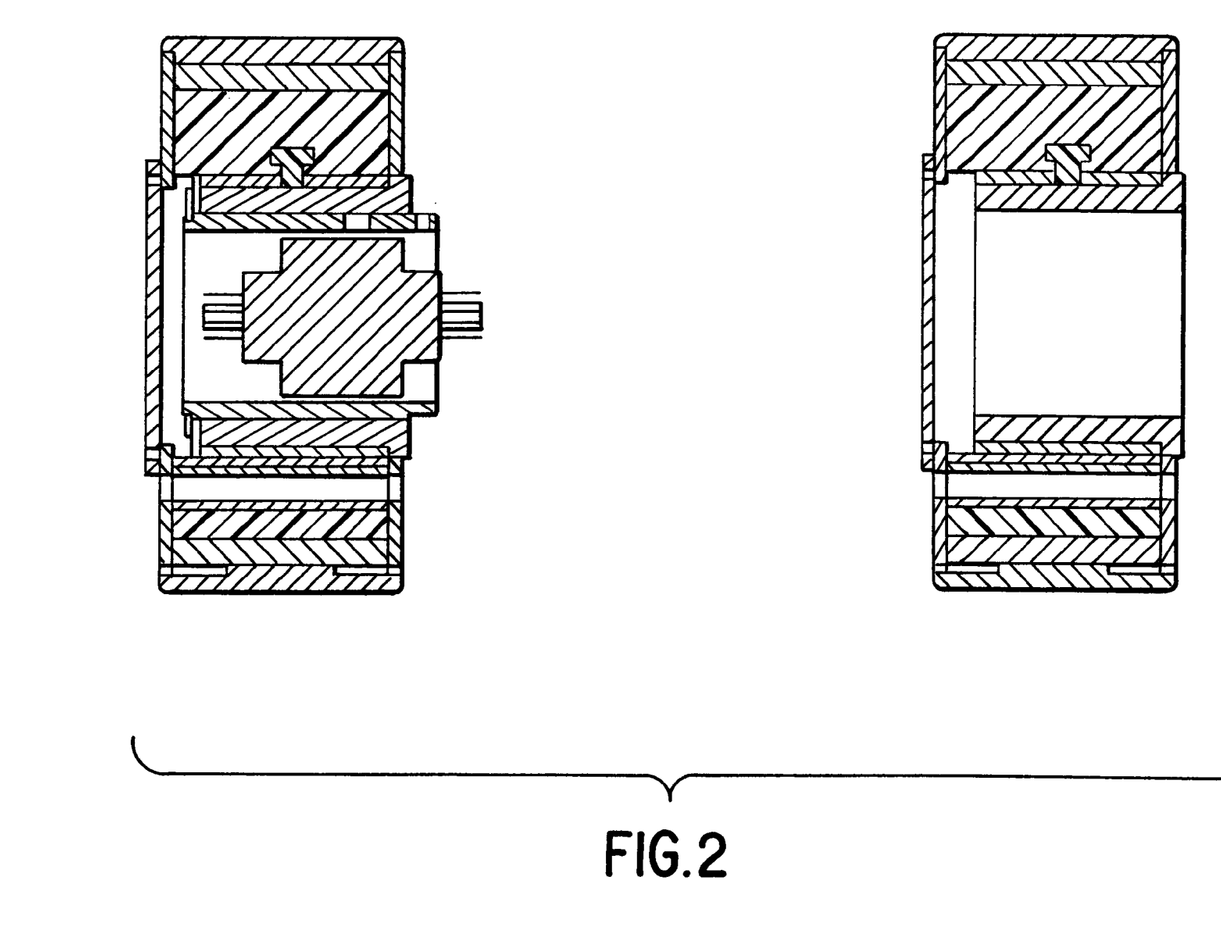
FIG. 2 represents a cross section of the heated wheel assembly.

Referring more particularly to the drawings, in which like parts are identified by the same numerals throughout the several views, FIG. 1 shows an exploded view of the heated wheel. In this embodiment, the wheel includes a rim 2 with a substantially cylindrical outer surface 4 and an inner surface 6. The outer surface of the rim may optionally include a deposited surface layer of a material such as hard chrome plating, teflon, and electroless nickel. A heater such as an electrical resistance heater 8 is sized to fit within the rim 2 such that the outer surface 10 of the heater is disposed adjacent the inner surface 6 of the rim 2 to bond the heater to the rim. In one embodiment, an adhesive is applied between the outer surface 10 of the heater 8 and the inner surface 6 of the rim 2 to hold the heater to the rim during or after manufacturing. A temperature sensor 12 is included, positioned to reside adjacent the inner surface 6 of the rim 2. In various embodiments, this sensor can comprise a thermocouple (TC) or a resistive thermal device (RTD).

FIG. 1 illustrates wires 14 for electrical connection between the temperature sensor and measuring circuitry by way of the slip ring assembly 16 and additional wires 18 for connection between the electrical heater 8 and an electrical power source by way of the slip ring assembly 16. A solid, thermally insulating, polymer casting 20 of substantially cylindrical shape is formed within the electrical heater 8, and in the working unit, the outer surface 22 of the polymer casting 20 is in intimate contact with the inner surface 24 of the electrical heater and bonded thereto. The polymer is selected from a variety of elastomers known in the art to have appropriate tolerance for high temperature, durometer and shear strength such as polyurethane or silicone or epoxy or polyester or mixtures thereof, including foamed and/or filled polymers. In one embodiment, three anchors 26 are embedded within the polymer, traversing the casting 22 in its axial direction. The anchors are generally hollow with internal threads. They are typically made of thermally conductive material, preferably a thermally conductive metal, and in one embodiment, of steel. During operation of the wheel, the anchors act to conduct heat out of the body of the polymer casting. In one embodiment, a metal bearing assembly, such as a bronze bearing assembly, is disposed within the polymer casting. The metal bearing assembly comprises a bearing housing 28 and, for example, a bronze bearing 30. The bearing housing 28 and the bearing 30 are each substantially cylindrical, and are arranged substantially coaxially with each other, and with the rim 2, the heater 8, and the polymer casting 20. In the assembled unit, the outer surface 32 of the bearing housing 28 is in intimate contact with an inside surface 34 of the polymer casting 20 and thus drivingly connected thereto. In one embodiment, the bearing housing 28 includes projecting dowels or grip members 36 supported by and extending radially from the bearing housing. In the assembled unit, these dowels extend into the body of the polymer casting 20, and thus engage the polymer so as to impede relative rotation between the bearing housing 30 and the polymer casting 20. The outer surface 38 of the bearing 30 supports the inner surface 40 of the bearing housing 28. In a further embodiment, the bearing comprises a fluoropolymer bushing, such as a PTFE (polytetrafluoroethylene) bushing. The PTFE bushing may be supported within a bearing housing, or may include grip members projecting radially outwardly from the PTFE. The PTFE bushing may be the bearing member of a self-aligning bearing assembly.

In one embodiment, the rim, temperature sensor, heater, wires, anchors, and bearing assembly are assembled within a mold. A liquid polymer such as polyurethane or epoxy, or constituents thereof, is then poured into the mold so as to flow into the interstices between the components noted above thereby forming, after setting, the polymer casting. The result is an integral wheel which can be heated by applying electrical power from a power source to the heater via the wires which run from the heater inwardly of the bearing.

The wheel of the present invention may be constructed in a variety of diameters. For example, a wheel may be constructed with a diameter in the range from about 3 inches to about 12 inches, or more preferably with a diameter in the range from about 4 inches to about 8 inches.

In a particularly effective embodiment, the heater includes a silicone rubber etched foil heater such as the Watlow F020150C8, manufactured by Watlow of Winona Wis. Such an etched foil heater is desirable because of its flexibility and its compact size.

In conjunction with an etched foil heater, as described above, it is desirable to use an auto-tuning controller.

Because of their low thermal mass, etched foil heaters tend to heat rapidly, and are prone to burnout during temperature overshoot. An auto-tuning controller, such as the Watlow series 96 controller minimizes overshoot, and thus prolongs the life of an etched foil heater.

FIG. 1 further discloses a mounting assembly for the heated wheel. The mounting assembly includes a hollow shaft 50 comprising a substantially rigid cylinder having a longitudinal axis and an outer bearing surface 52 and including on the outer surface a turned down portion 54 of reduced diameter. The shaft supports the bearings for rotation with respect thereto. The turned down portion 54 is adapted to be supported by the cylindrical inner wall 56 of an aperture through an adjustable wheel mount arm 58 adjacent one end of the arm. Both the turned down portion 54 of the shaft 50 and the wheel mount arm 58 include radial holes 60 and 62 respectively. These holes are positioned so as to allow alignment of the holes 60 in the shaft with corresponding holes 62 in the wheel mount arm. The holes are adapted to receive spring pins 64 therewithin whereby the turned down portion 54 of the shaft 50 is fixedly secured within the aperture defined by inner surface 56. Adjacent the opposite end of the shaft 50 from the turned down portion 54, a groove 66 is provided in the outer surface of the shaft. The groove is adapted to accommodate a retainer ring 62 therewithin. The retainer ring has a flat surface 68, a portion of which projects outside of groove 66 to contact a portion of an opposing outer face 70 of washer 72 and thereby retain washer 72 in a position disposed coaxially about shaft 50. Opposite face 74 of washer 72, in turn, contacts a portion of the flat end surface 76 of bearing 30, thereby limiting axial movement of, and retaining, bearing 30, and with it the wheel assembly, in a position disposed coaxially about shaft 50. Axial movement of bearing 30 in a direction away from the washer 72 is limited by the impingement of flat surface 78 of bearing 30 against a portion of a surface 80 of wheel mount arm 58. Thus it is seen that the axial motion of bearing upon shaft 50 is limited at one end by surface 80 of wheel mount arm 58 and at the other end by washer 70, which is in turn retained by retainer ring 62.

In the assembled unit, slip ring assembly 16 is disposed within the hollow bore of shaft 50, and retained therewithin by fasteners installed within holes 82, and 84. For example the slip ring assembly 16 may be retained by set-screws threadedly installed within holes 82 and 84, in an embodiment in which holes 82 and 84 are tapped to receive such set screws. The slip ring assembly includes rotating connection points 86 and stationary connection points 88. The rotating connection points are adapted to connect to wires 14 and 18, with the corresponding stationary connection points being adapted to connect to a heater power source and temperature measurement circuitry respectively.

The heated wheel assembly optionally includes a front plate 90 and a back plate 92. The front plate and back plates serve to add rotary and lateral stability to the wheel assembly, to protect the assembly from contamination, and to sink heat from the interior of the wheel for dissipation into the surrounding air. The front plate 90 is supported adjacent the front face 94 of polymer casting 20 by fasteners 96 connected to anchors 26. Similarly, back plate 92 is supported adjacent the rear face 98 of the polymer casting by fasteners connected to the anchors. The fasteners could be bolts or screws, in which case, the anchors would include an internally threaded axial bore. In another embodiment, the plates might be connected to the anchors by welding, by thermally conductive adhesive, or by any other appropriate means. In one embodiment, the diameters of front plate 90 and back plate 92 are chosen to avoid contact with the rim 2. Also, in one embodiment the length of anchors 26 and the corresponding thickness of polymer casting 20 is chosen to prevent contact between either the front plate 90 or the back plate 92 with the heater 8. In another embodiment, the front and back plates contact the edge of the rim.

In one embodiment, an end cap 94 is provided to enclose the end of the shaft 50 thereby covering the wiring and rotating connection points 86 of the slip ring, and protecting them from mechanical damage and from contamination with dirt or other material. The end cap is secured adjacent the back plate 92 with fasteners, such as screws 96 passing through holes 98 in the end cap and, for example, threadedly disposed within tapped holes 100 in the back plate.

In one embodiment, the wheel mount arm 58 includes a base plate 102 fixedly mounted to one end of the wheel mount arm, and substantially perpendicular to the arm. The base plate includes a substantially flat upper surface 104 and four through holes 106 through the base plate perpendicular to the upper surface. In one embodiment, a camber plate 107 including a flat upper surface 108 and an arcuate lower surface 110 is provided to allow adjustment of wheel camber. As would be understood by one of skill in the art, a variety of other arrangements may be used to set or maintain camber either with an external mechanism, or with an adjusting mechanism within the wheel such as a spherical bearing. It is desirable that the camber mechanism allows adjustment of the camber in the range from about 0 degrees to about 6 degrees in either direction in the plane of the axis of the wheel off the vertical. Adjustment in the alignment of the hot wheel may also be desirable, and an appropriate mechanism may be provided for such adjustment.

Figure 6A:
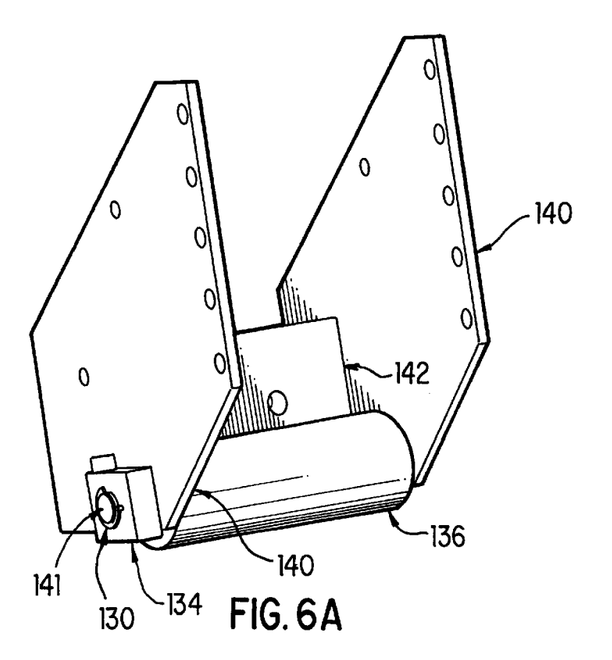
FIG. 6A represents a perspective view of one embodiment of a camber adjustment mechanism.
Figure 6B:
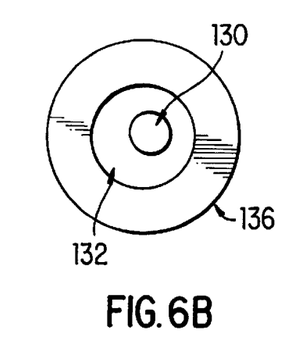
FIG. 6B represents a side elevation showing the eccentric bushing mounted within the housing of a camber adjustment mechanism.

One such further embodiment is illustrated in FIG. 6A and FIG. 6B which show a shaft 130, an eccentric bushing 132, a lock collar 134, and a housing 136. The bushing is pinned to the shaft 130, which is mounted through the side plates 140 of the applicator, and within the housing. One end 141 of the shaft passes through the lock collar 134 to hold the camber setting after adjustment. The slide (cylinder 112) and wheel assembly are supported by the housing mount plate 142. Unlocking the collar and rotating the shaft causes the housing (and attached components) to oscillate in a combined left/right and a for/aft motion, shifting the wheel camber. The magnitude of the oscillation is determined by the eccentricity of the bushing.

Figure 7A:
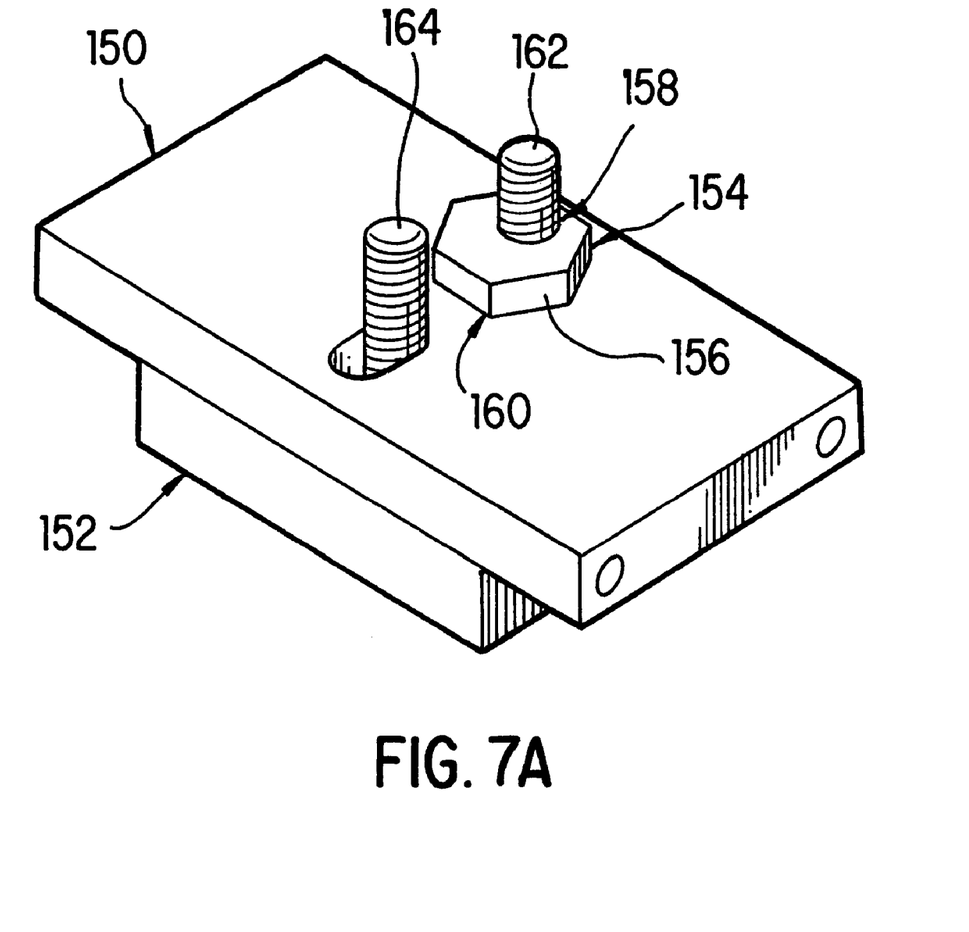
FIG. 7A represents a further embodiment of a camber adjustment mechanism.
Figure 7B:
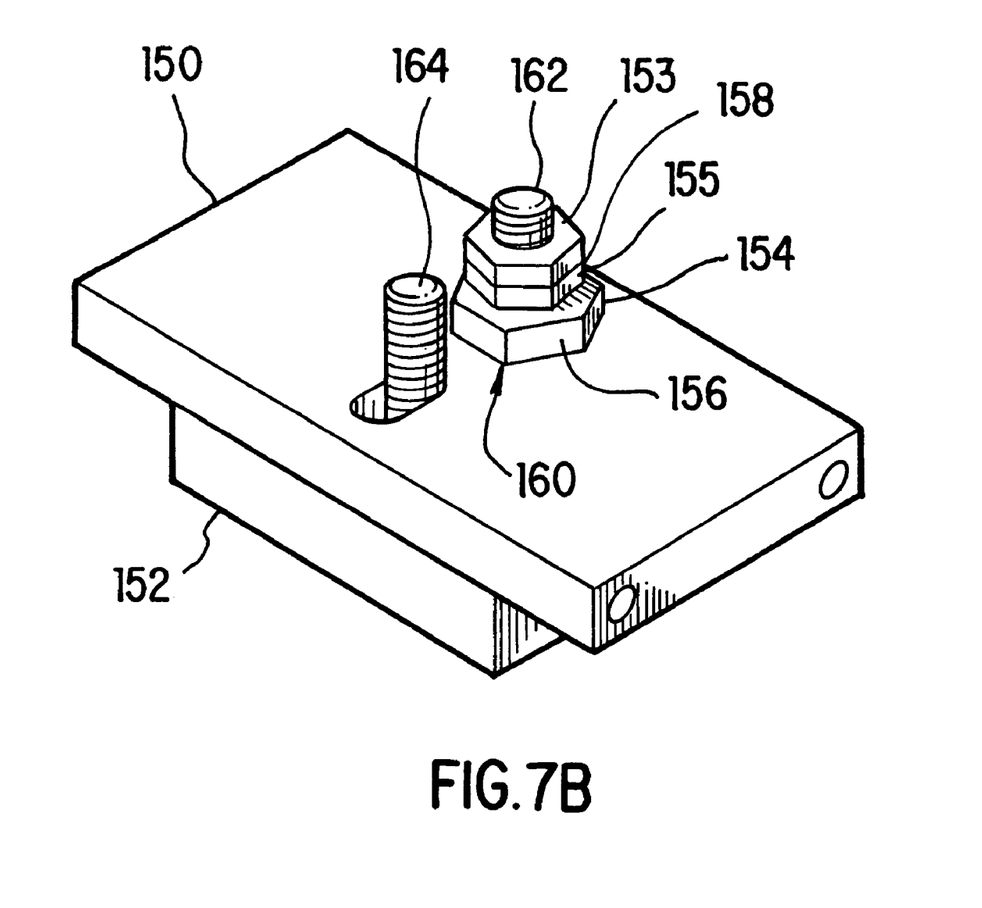
FIG. 7B represents the camber adjustment mechanism of FIG. 7A, further illustrating a lock nut.
Figure 7C:
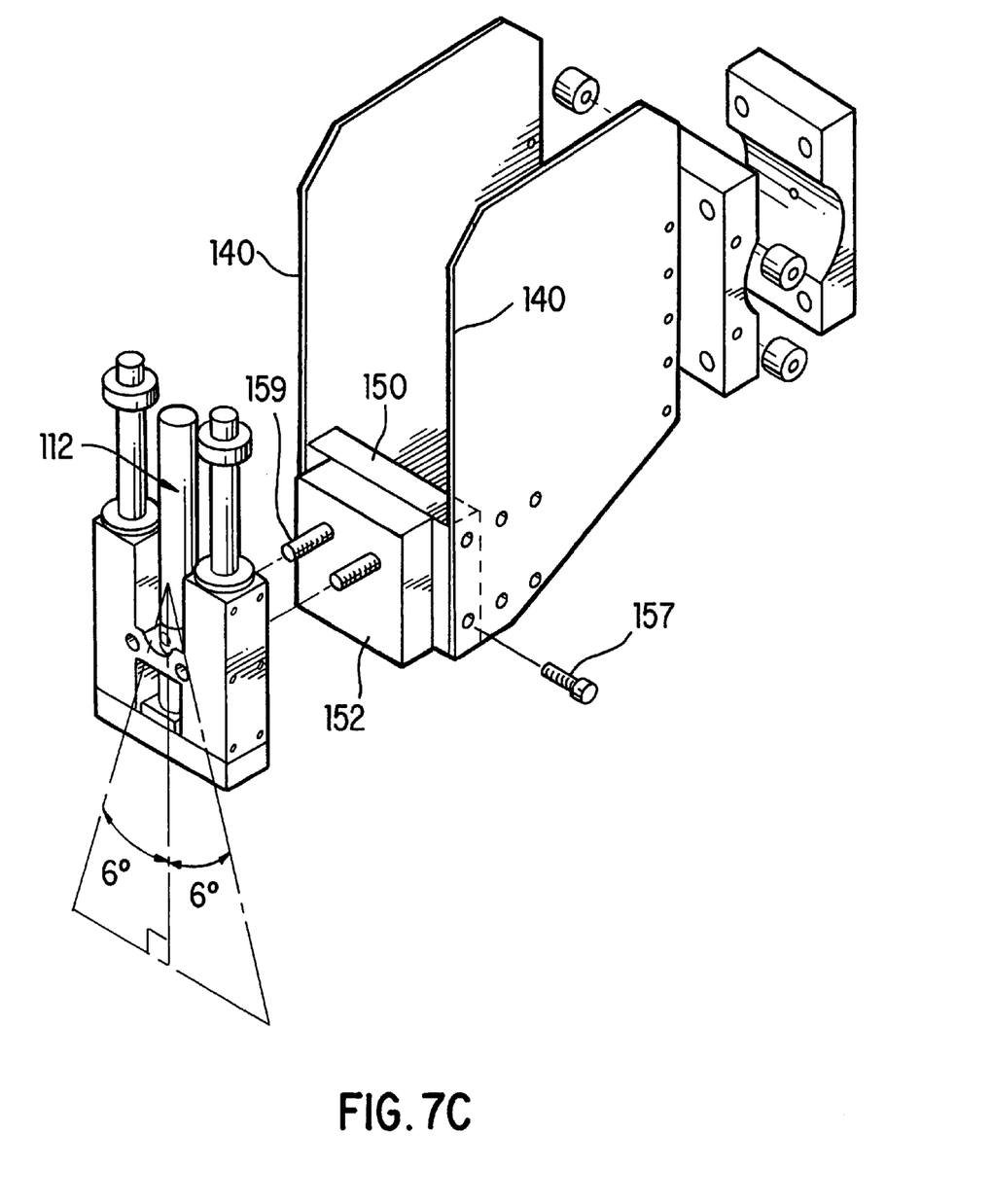
FIG. 7C illustrates the relationship between the side plates, the camber adjustment mechanism of FIG. 7B, and the cylinder assembly.

A still further embodiment is illustrated in FIG. 7A, which shows two flat plates 150 and 152, a much smaller eccentric bushing 154 and locking nuts 153 and 155, as shown in FIG. 7B. The back plate 150 is bolted to the sides of the applicator 140 with fasteners 157, as shown in FIG. 7C, and the stud plate 152 is bolted to the cylinder/wheel assembly with fasteners 159. The bushing includes wrench flats 156 on one end, and an off center hole 158, sized to fit over the threaded studs 162 and 164. The bushing fits within the larger hole 160 in the back plate, and over one 162 of the two threaded studs on the stud plate 152. The other stud passes through a slot in the back plate. The entire assembly is held together with first and second lock nuts, 153 and 155 respectively. To adjust the camber, the lock nuts are loosened slightly, the eccentric bushing is rotated left or right to set camber, and the lock nuts are tightened. This design allows a true left/right adjustment of the wheel without adding a for/aft motion. (The combined up/down motion present in this design is compensated by the air cylinder 112.) The "sensitivity" of the adjustment is determined by the ratio the stud hole offset in the bushing, and the vertical spacing of the studs. A large offset and a short stud spacing will cause a relatively large camber change with bushing rotation, and vice versa.

Figure 8:
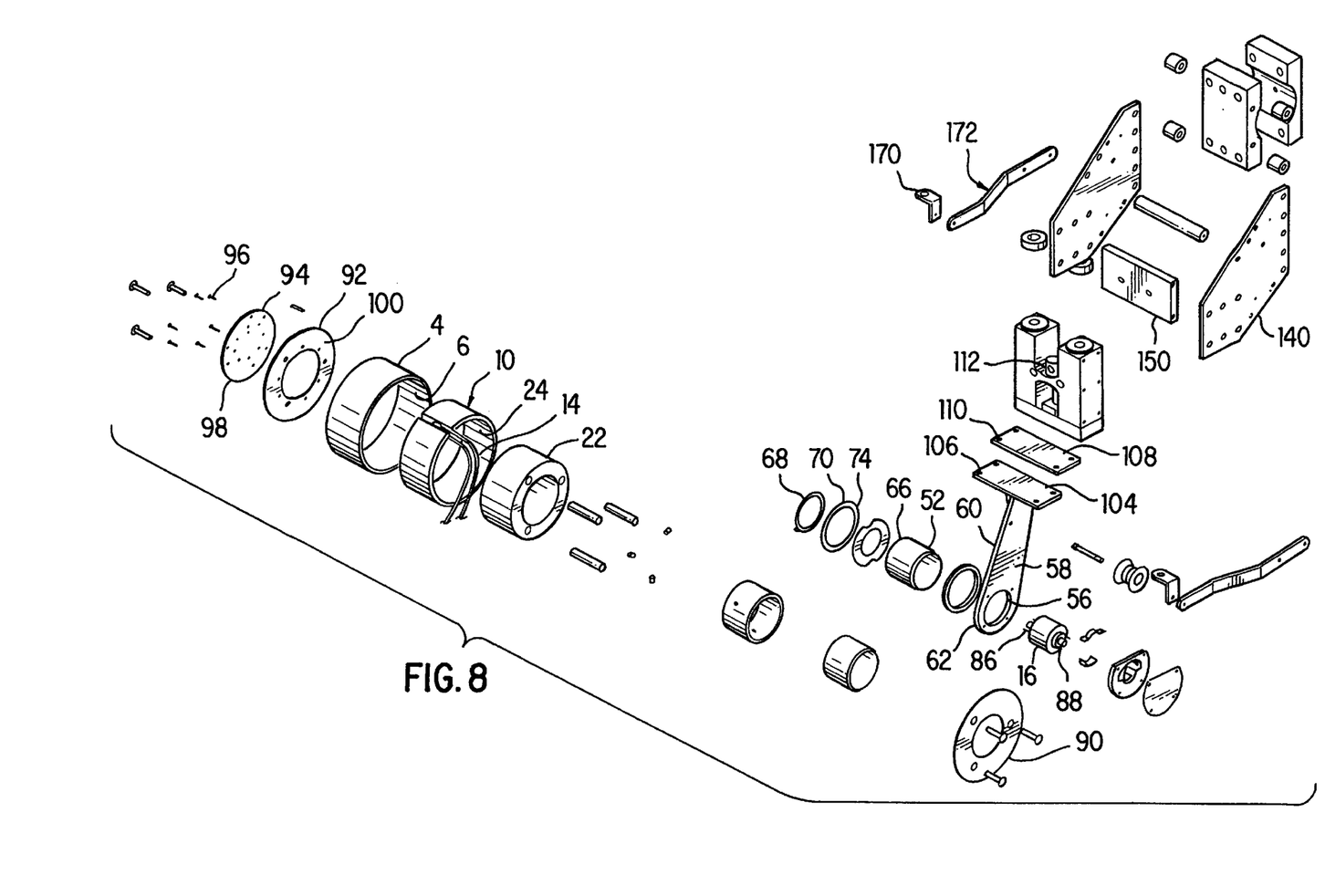
FIG. 8 represents an exploded perspective view of a further embodiment of the heated wheel assembly including the pneumatic mounting apparatus and eyelet.

In a still further embodiment, as shown in FIG. 8, an eyelet 170 is provided to guide the tape effectively onto the wheel and keep it centered. The eyelet is supported on a support arm 172, which is, in turn, supported by a side plate 140.

The heated wheel may be used for applying a heat activated or pressure sensitive adhesive tape to veneer during the composing of plywood. During the process, first and second sheets of wood veneer are provided within a composing machine. Each sheet of veneer has a broad, substantially flat surface and a bonding edge. The bonding edge of the first sheet is placed adjacent the bonding edge of the second sheet so that the two sheets are ready to be joined to each other. The heated wheel, as described above, is positioned with outer surface adjacent to but spaced from the flat surface of the first sheet of veneer. Initially, the outer surface of the rim of the wheel may be pressed to the flat surface of the first sheet of veneer, or spaced from the veneer by a small amount. This small space is called a nip. The wheel is initially located at a point spaced away from the bonding edges. A tape, for example having a polymer backing such as polyester, with a heat activated hot-melt adhesive is provided to the wheel assembly. The wheel is rotated about its axis and the axis is moved relative to said first sheet of veneer as the wheel rolls towards the bonding edges. During this motion, the axis of the wheel and the flat surface of the veneer remain generally parallel to one another. As the wheel rolls, tape is fed onto the outer surface of the wheel and moves around the axis of the wheel in contact with the surface of the rim. While the tape is in contact with the surface of the rim, it is heated, and the adhesive on the tape is activated. As the heated tape moves into the nip it is pressed against the flat surface of the first sheet of veneer where it bonds to the flat surface of the first sheet of veneer. As the wheel rolls on, the tape is released from the surface of the wheel rim and the wheel moves away relative to the freshly bonded tape. The tape cools and the bond sets, forming a strong connection between the tape and the wood releasing the tape from the outer surface of the rim. As the process continues, the wheel rolls across the junction between the bonding edges, and the tape bonds to the second sheet of veneer. The result is that the tape forms an adhesive structural element for maintaining said first and second bonding edges adjacent one another. In effect, the two sheets of veneer are taped or unitized together.

As is shown in FIG. 1, an adjustment mechanism, including a pneumatic cylinder assembly 112 may be employed to urge the wheel mount arm, and thereby the wheel, towards the surface of the plywood. Various other mechanisms, such as an electrical linear actuator, or a spring loaded mechanism would serve an equivalent purpose.

In one embodiment, the wheel mount arm 58 is equipped with a pulley arm 114 adapted to support a pulley 116 and string guide 118 on an axle 120. As further illustrated in FIG. 3. the pulley 116 guides the tape into contact with the surface of the rim of the wheel.

Figure 3:
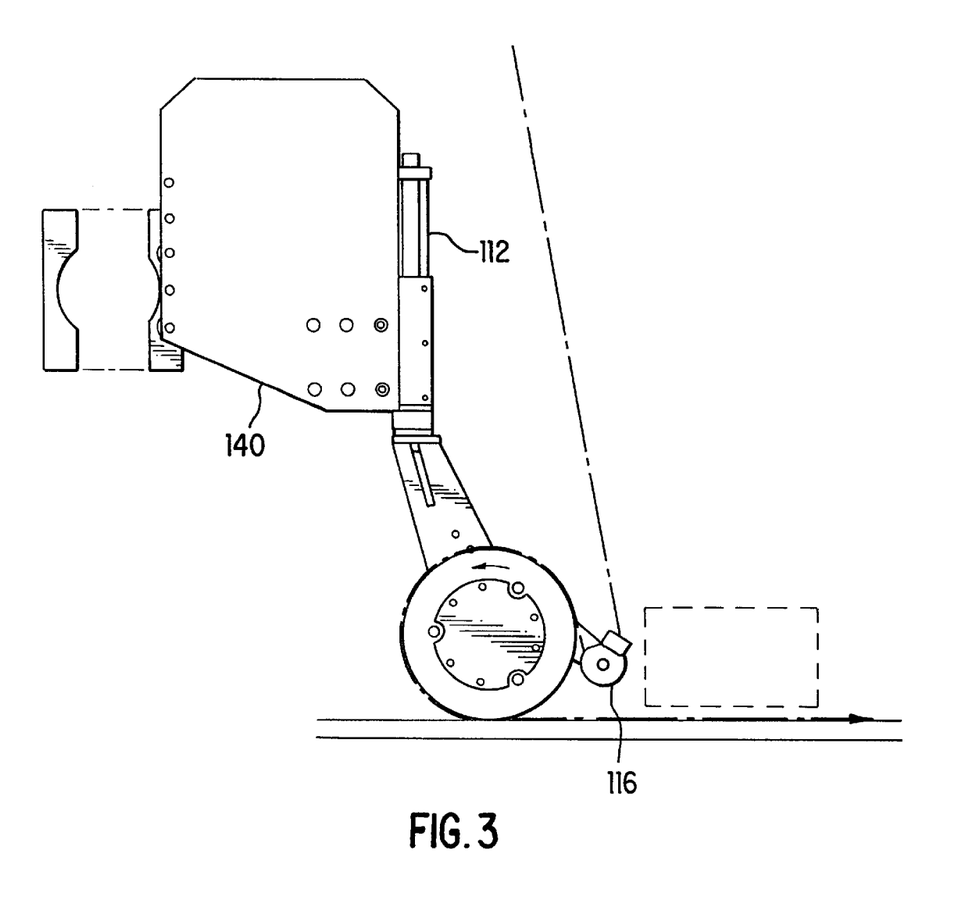
FIG. 3 represents a side elevation showing the path of the tape with heat-activated adhesive around the surface of the heated wheel.
Figure 4:
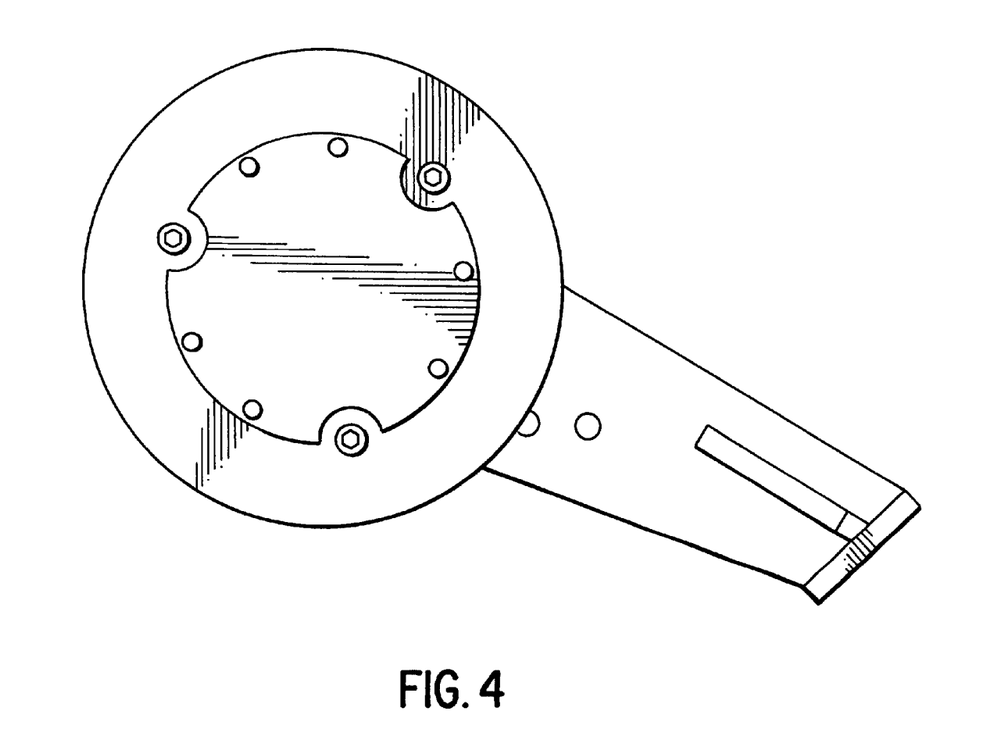
FIG. 4 represents a side elevation of the heated wheel, including the mounting arm and cover plate.

In another embodiment, the heated wheel includes a capstan 122 adapted to maintain a desired level of tension in the tape as it is delivered to the pulley 116, and from there to the surface of the heated wheel. The capstan is mounted on a capstan arm 124, so as to maintain the capstan in fixed relation to the heated wheel. In one embodiment, the tape entering the capstan makes a complete 360 degree revolution about the capstan in order to ensure that the surface of the capstan will properly engage the tape so as to effectively pull the tape toward the heated wheel. The capstan is driven at a speed adapted to maintain a constant tension in the tape between the capstan and the heated wheel. This speed may be accomplished by driving the capstan in a geared ratio relative to the wheel, for example by a belt 126 as shown, chain, or gear train. By controlling the tension within the tape as it is deposited on the surface of the substrate, the present invention reduces unwanted internal stresses in the adhesive bond and/or substrate, thereby improving the quality of the product.

Figure 5:
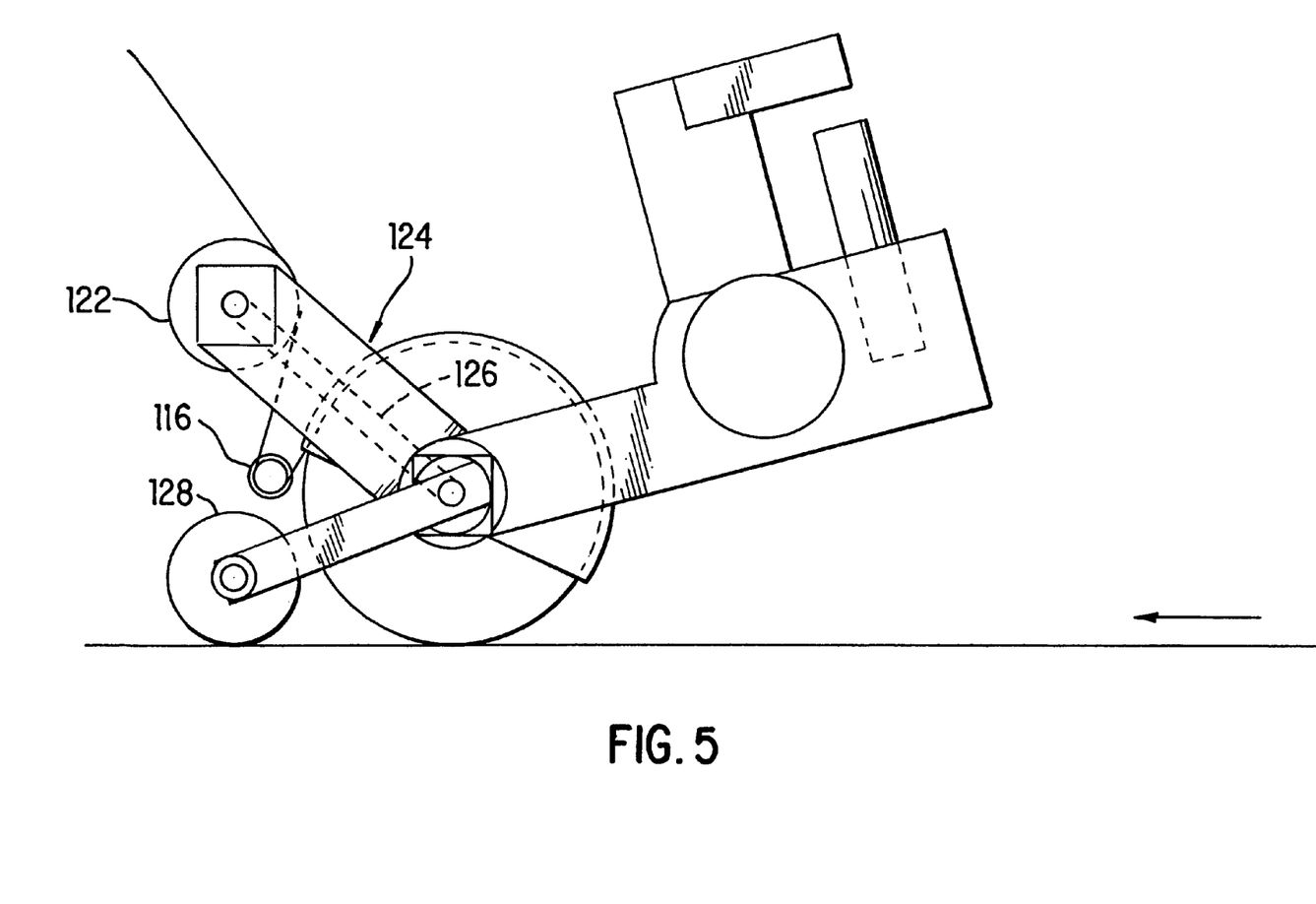
FIG. 5 represents a side elevation showing the path of the tape with heat-activated adhesive around the surface of the heated wheel and including a capstan and chill wheel.

In a further embodiment, the heated wheel may include a chill wheel 128, as shown in FIG. 5. The chill wheel acts to lower the temperature of the adhesive more rapidly than cooling in the ambient atmosphere, and to further urge the tape onto the surface of the veneer. Alternative cooling arrangements may also be employed to post-cool the tape, such as a venturi cooler, air knife or other apparatus for directing flowing air towards the surface of the freshly deposited tape.

Generally in the prior art, heated wheels are of much larger diameter. The wheel of the present invention, however, presents novel opportunities. Unlike prior art heated wheels, which heated the rim of the wheel by radiant and convective heating across an air gap, the wheel of the present invention includes a heating element directly mounted to the interior side of the wheel rim. The heating element thus heats the rim by direct conduction. Consequently, the wheel of the present invention may be made in a smaller configuration and mounted in areas where the application of heat by a heated wheel was previously impractical. When used for tacking (point heating) a heat activated or pressure sensitive adhesive tape on corrugated board during a corrugated board manufacturing process, the wheel would be stationed at the "dry end" of the corrugator and positioned so that the tape, already laying on the board, would travel under the heated rim and be activated by the rim.

In a further embodiment, the invention includes a method of partially or temporarily bonding heat activated or pressure sensitive adhesive tape to a substrate by providing a heat activated tape, a substrate, and a heated wheel with a heated rim. The rim may be heated by conduction through its inner face such that heat is conducted to the outer face of the rim. A portion of heat activated tape is briefly brought into contact with a substrate and passed into contact with the outer surface of the rim. Consequently, the tape is partially or temporarily bonded to the substrate. Subsequently, a second heated wheel or other heating means, may be used to further heat the partially or temporarily bonded tape, causing it to more fully or permanently bond to the substrate.

In yet another embodiment of the invention, a temporarily bonded tape, as described above, may be used as a temporary marking on a substrate. Since the tape is only partially bonded to the substrate, once the mark is no longer needed, the tape may be removed from the substrate, thereby eliminating the marking.

Having reviewed the foregoing disclosure which is intended to be exemplary and not limiting, one of skill in the art will perceive various alternative embodiments and improvements. All such embodiments and improvements are intended to be within the scope of the invention, which is defined solely by the following claims.

What is claimed is:

1. A heated wheel for applying heat activated tape to wood comprising, a rim having a longitudinal axis and a substantially cylindrical outer surface for engaging heat activated tape, said rim having an inner surface, an electric heater supported in fixed relation to said inner surface, a solid body of heat insulating material disposed within and bonded to said heater, a bearing disposed within said body, said bearing being drivingly connected to said body, and electrical connections extending from said heater to a point inwardly of said bearing.

2. A heated wheel as defined in claim 1 wherein said wheel comprises a pair of plates disposed at opposite sides thereof, at least one anchor extending between said plates to hold said plates in position, said anchor extending through said body for conducting heat from said body to said plates.

3. A heated wheel as defined in claim 2 wherein said anchor comprises an axial bore, a fastener disposed within said bore and engaging said end plates to hold said end plates in position.

4. A heated wheel as defined in claim 3 wherein said axial bore further comprises internal threads, and said fastener including bolt means engaging said threads and said end plates.

5. A heated wheel as defined in claim 1 wherein said bearing is drivingly connected to said body by a plurality of grip members extending between said body and said bearing, said grip members supported by said bearing and engaging said body.

6. A heated wheel as defined in claim 1 wherein said heat insulating material is polymeric.

7. A heated wheel as defined in claim 1 wherein said outer surface of said rim includes a coating of non-adherent material.

8. A heated wheel as defined in claim 7 wherein said coating is nickel.

9. A heated wheel as defined in claim 1 wherein said bearing further comprises a PTFE bushing.

10. A heated wheel as defined in claim 1 wherein said bearing further comprises a bronze bearing.

11. A heated wheel as defined in claim 1 wherein said bearing further comprises a spherical bearing assembly.

12. A heated wheel for applying heat activated tape to wood comprising, a rim having a longitudinal axis and a substantially cylindrical outer surface for engaging heat activated tape, said rim having an inner surface, an electrical heater supported in fixed relation, and proximate to, said inner surface, a solid body of heat insulating material disposed within and bonded to said heater, a bearing disposed within said body, said bearing being drivingly connected to said body, and an adjustable arm, a shaft carried by said arm, said bearing being supported on said shaft for rotation with respect thereto, a slip ring assembly supported by said shaft and electrical connections between said slip ring assembly and said heater.

13. A heated wheel as defined in claim 12, further comprising a camber adjustment mechanism.

14. A heated wheel as defined in claim 13 wherein said camber adjustment mechanism comprises a camber adjustment plate with an arcuate surface.

15. A heated wheel as defined in claim 13 wherein said camber adjustment mechanism comprises a side plate, an elongate housing having a bore axially therethrough, an eccentric bushing disposed within said bore, said busing having an axial bore, and a shaft disposed therewithin, and means for locking said shaft in position relative to said side plate.

16. A heated wheel as defined in claim 13 wherein said camber adjustment mechanism comprises a back plate and a stud plate each having a bearing surface, said bearing surfaces disposed in opposing contact, said stud plate having first and second threaded studs projecting from said bearing surface of said stud plate, said back plate having a hole therethrough adapted to receive an elongate eccentric bushing and a slot therethrough adapted to receive said first threaded stud, an eccentric bushing disposed within said hole and having an axial bore therethrough, said second threaded stud being disposed within said bore.

17. A heated wheel as defined in claim 12 comprising an eyelet for guiding heat activated tape into contact with said outer surface of said wheel, said guide pulley being supported on a guide arm which is in turn supported by said adjustable arm.

18. A heated wheel as defined in claim 12, wherein said heater further comprises a silicone rubber etched foil heater.

19. A heated wheel as defined in claim 12, wherein said heater is controlled by a temperature controller.

20. A heated wheel as defined in claim 19, wherein said temperature controller further comprises an auto-tuning temperature controller.

21. A method of tacking a heat activated or pressure sensitive tape to a substrate comprising providing a heat activated tape, a substrate, and a heated wheel having a heated rim including a heater and a solid body of insulating material disposed within and bonded to the heater) heating said rim by conduction through an inner face of said rim, passing a portion of said heat activated tape into contact with said substrate and passing said heat activated tape into contact with an outer surface of said rim whereby said tape is at least partially bonded to said substrate.

22. A method of tacking a heat activated or pressure sensitive tape to a substrate comprising providing a heat activated tape, a substrate, and a heated wheel having a heated rim, heating said rim by conduction through an inner face of said rim, passing a portion of said heat activated tape into contact with said substrate and passing said heat activated tape into contact with an outer surface of said rim whereby said tape is at least partially bonded to said substrate, providing a second heated wheel having a second heated rim, heating said second heated rim, and passing a portion of said partially bonded heat activated rape into contact with an outer surface of said second rim whereby said tape is filly bonded to said substrate.

23. A method of temporarily marking a substrate comprising providing a heat activated tape, a substrate, and a heated wheel having a heated rim, heating said rim by conduction through an inner face of said rim, passing a portion of said heat activated tape into contact with said substrate and passing said heat activated tape into contact with an outer surface of said rim whereby said tape is temporarily bonded to said substrate and thereby serves as a marking on said substrate so that once said marking is no longer needed, the tape may be removed from the substrate.

24. A heated wheel as defined in claim 1, having a diameter in the range from about 3 inches to about 12 inches.

25. A heated wheel as defined in claim 1, having a camber adjustment mechanism capable of adjusting camber from about 0 degrees to about plus or minus 6 degrees from the vertical.

26. A method of tacking a heat activated or pressure sensitive tape to a substrate comprising providing a heat activated tape, a substrate, and a heated wheel having a heated rim and a bearing disposed inwardly of said rim, heating said rim by conduction through an inner face of said rim, passing a portion of said heat activated tape into contact with said substrate and passing said heat activated tape into contact with an outer surface of said rim whereby said tape is at least partially bonded to said substrate.

* * * * *

UNITED STATES PATENT AND TRADEMARK OFFICE
CERTIFICATE OF CORRECTION

PATENT NO. : 6,358,356 B1  
DATED : March 19, 2002  
INVENTOR(S) : Dennis A. Bradshaw and Donald W. Scott It is certified that error appears in the above-identified patent and that said Letters Patent is hereby corrected as shown below:

<u>Column 10,</u>  
Line 22, ")" should be -- , --  
Line 39, "rape" should be -- tape --  
Line 40, "filly" should read -- fully --

<u>Column 9,</u>  
Line 58, "said busing" should be -- said bushing --.

Signed and Sealed this

Twentieth Day of May, 2003

JAMES E. ROGAN  
*Director of the United States Patent and Trademark Office*